United States Patent
Hsu et al.

(10) Patent No.: US 10,298,956 B2
(45) Date of Patent: May 21, 2019

(54) METHOD AND APPARATUS FOR BLOCK-BASED SIGNIFICANCE MAP AND SIGNIFICANCE GROUP FLAG CONTEXT SELECTION

(71) Applicant: HFI Innovation Inc., Zhubei, Hsinchu County (TW)

(72) Inventors: Chih-Wei Hsu, Taipei (TW); Tzu-Der Chuang, Hsinchu County (TW); Ching-Yeh Chen, Taipei (TW); Yu-Wen Huang, Taipei (TW)

(73) Assignee: HFI Innovation Inc., Zhubei (TW)

( * ) Notice: Subject to any disclaimer, the term of this patent is extended or adjusted under 35 U.S.C. 154(b) by 916 days.

(21) Appl. No.: 14/368,264

(22) PCT Filed: Nov. 22, 2012

(86) PCT No.: PCT/CN2012/085034
§ 371 (c)(1),
(2) Date: Jun. 23, 2014

(87) PCT Pub. No.: WO2013/102380
PCT Pub. Date: Jul. 11, 2013

(65) Prior Publication Data
US 2015/0003514 A1 Jan. 1, 2015

Related U.S. Application Data

(60) Provisional application No. 61/582,725, filed on Jan. 3, 2012.

(51) Int. Cl.
H04N 19/136 (2014.01)
H04N 19/64 (2014.01)
(Continued)

(52) U.S. Cl.
CPC ......... *H04N 19/647* (2014.11); *H04N 19/129* (2014.11); *H04N 19/13* (2014.11);
(Continued)

(58) Field of Classification Search
CPC ...................................................... H04N 19/60
See application file for complete search history.

(56) References Cited

U.S. PATENT DOCUMENTS 6,856,701 B2 2/2005 Karczewicz et al.
8,599,925 B2 12/2013 Srinivasan
(Continued)

FOREIGN PATENT DOCUMENTS

CN 1874509 12/2006
CN 101243611 8/2008
(Continued)

OTHER PUBLICATIONS

Chuang, T.D., et al.; "Block-Based Significance Map Context Selection;" Joint Collaborative Team on Video Coding (JCT-VC) of ITU-T SG 16 WP3 and ISO/IEC JTC1/SC29/WG11; Feb. 2012; pp. 1-5.
(Continued)

Primary Examiner — Dramos Kalapodas
Assistant Examiner — Berteau Joisil
(74) Attorney, Agent, or Firm — Wolf, Greenfield & Sacks, P.C.

(57) ABSTRACT

A method and apparatus for significance map context selection are disclosed. According to the present invention, the TUs are divided into sub-blocks and at least two context sets are used. Non-DC transform coefficients in each sub-block are coded based on the same context, context set, or context formation. The context, context set, or context formation for each sub- block can be determined based on sub-block index in scan order, horizontal sub-block index, vertical sub-block
(Continued)

index, video component type, TU width, TU height, or any combination of the above. In one embodiment, the sum of the horizontal and the vertical sub-block indexes is used to classify each sub-block into a class and the context, context set, or context formation is then determined according to the class.

19 Claims, 5 Drawing Sheets

(51) Int. Cl.
*H04N 19/46* (2014.01)
*H04N 19/13* (2014.01)
*H04N 19/18* (2014.01)
*H04N 19/129* (2014.01)
*H04N 19/60* (2014.01)

(52) U.S. Cl.
CPC ........... *H04N 19/136* (2014.11); *H04N 19/18* (2014.11); *H04N 19/46* (2014.11); *H04N 19/60* (2014.11)

(56) References Cited

U.S. PATENT DOCUMENTS

| | | | | |
|---|---|---|---|---|
| 2013/0058418 | A1* | 3/2013 | Lu | H03M 7/4006 375/240.18 |
| 2013/0128985 | A1 | 5/2013 | He et al. | |
| 2013/0188684 | A1* | 7/2013 | Terada | H04N 19/70 375/240.02 |
| 2013/0215969 | A1* | 8/2013 | Fang | H04N 19/70 375/240.18 |

FOREIGN PATENT DOCUMENTS

| | | |
|---|---|---|
| CN | 101389021 A | 3/2009 |
| CN | 101938657 A | 1/2011 |
| EP | 2 797 321 | 10/2014 |
| WO | 2011129672 A2 | 10/2011 |
| WO | WO 2011/128303 | 10/2011 |
| WO | 2011142817 A1 | 11/2011 |

OTHER PUBLICATIONS

Ji, T., et al.; "Sub-Block Based Significance Map Region Classification;" Joint Collaborative Team on Video Coding (JCT-VC) of ITU-T SG 16 WP3 and ISO/IEC JTC1/SC29/WG11; Feb. 2012; pp. 1-10.

Terads, K., et al.; "Simplification of Context Selection for Significant_Coeff_Flag;" oint Collaborative Team on Video Coding (JCT-VC) of ITU-T SG 16 WP3 and ISO/IEC JTC1/SC29/WG11; Feb. 2012; pp. 1-9.

* cited by examiner

| 0 | 1 | 4 | 5 |
|---|---|---|---|
| 2 | 3 | 4 | 5 |
| 6 | 6 | 8 | 8 |
| 7 | 7 | 8 |   |

310

| 0 | 1 | 2 | 4 |
|---|---|---|---|
| 1 | 1 | 2 | 4 |
| 3 | 3 | 5 | 5 |
| 4 | 4 | 5 |   |

| 15* | 0  | 1  | 1  | 2  | 2  | 3  | 3  |
|-----|----|----|----|----|----|----|----|
| 0   | 0  | 1  | 1  | 2  | 2  | 3  | 3  |
| 4   | 4  | 5  | 5  | 10 | 10 | 3  | 3  |
| 4   | 4  | 5  | 5  | 10 | 10 | 3  | 3  |
| 8   | 8  | 10 | 10 | 10 | 10 | 11 | 11 |
| 8   | 8  | 10 | 10 | 10 | 10 | 11 | 11 |
| 12  | 12 | 12 | 12 | 11 | 11 | 11 | 11 |
| 12  | 12 | 12 | 12 | 11 | 11 | 11 |    |

*Fig. 4* ns stage filing under 35 U.S.C.
METHOD AND APPARATUS FOR BLOCK-BASED SIGNIFICANCE MAP AND SIGNIFICANCE GROUP FLAG CONTEXT SELECTION

CROSS REFERENCE TO RELATED APPLICATIONS

This Application is a national stage filing under 35 U.S.C. 371 of International Patent Application Serial No. PCT/CN2012/085034, filed Nov. 22, 2012, entitled "METHOD AND APPARATUS FOR BLOCK-BASED SIGNIFICANCE MAP AND SIGNIFICANCE GROUP FLAG CONTEXT SELECTION", which claims priority to U.S. Provisional Application, Ser. No. 61/582,725, filed Jan. 3, 2012, entitled "BLOCK-BASED SIGNIFICANCE MAP AND SIGNIFICANCE GROUP FLAG CONTEXT SELECTION METHOD". The entire contents of each of which is incorporated herein by reference.

FIELD OF INVENTION

The present invention relates to video coding or video processing. In particular, the present invention relates to significance map coding and significance group flag coding.

BACKGROUND OF THE INVENTION

The arithmetic coding is known as an efficient data compressing method and is widely used in coding standards, such as JBIG, JPEG2000, H.264/AVC, and High-Efficiency Video Coding (HEVC). In H.264/AVC JVT Test Model (JM) and HEVC Test Model (HM), Context-Based Adaptive Binary Arithmetic Coding (CABAC) is adopted as the entropy coding tool for various syntax elements in the video coding system.

FIG. 1 illustrates an example of CABAC encoder 100 which includes three parts: Binarization 110, Context Modeling 120, and Binary Arithmetic Coding (BAC) 130. In the binarization step, each syntax element is uniquely mapped into a binary string (also called bin or bins in this disclosure). In the context modeling step, a probability model is selected for each bin. The corresponding probability model may depend on previously encoded syntax elements, bin indexes, side information, or any combination of the above. After the binarization and the context model assignment, a bin value along with its associated context model is provided to the binary arithmetic coding engine, i.e., the BAC 130 block in FIG. 1. The bin value can be coded in two coding modes depending on the syntax element and bin indexes, where one is the regular coding mode, and the other is the bypass mode. The bins corresponding to regular coding mode are referred to as regular bins and the bins corresponding to bypass coding mode are referred to as bypass bins in this disclosure. In the regular coding mode, the probability of the Most Probable Symbol (MPS) and the probability of the Least Probable Symbol (LPS) for BAC are derived from the associated context model. In the bypass coding mode, the probability of the MPS and the LPS are equal. In CABAC, the bypass mode is introduced to speed up the encoding process.

High-Efficiency Video Coding (HEVC) is a new international video coding standard that is being developed by the Joint Collaborative Team on Video Coding (JCT-VC). HEVC is based on the hybrid block-based motion-compensated DCT-like transform coding architecture. The basic unit for compression, termed Coding Unit (CU), is a 2N×2N square block, and each CU can be recursively split into four smaller CUs until a predefined minimum size is reached. Each CU contains one or several variable-block-sized Prediction Unit(s) (PUs) and Transform Unit(s) (TUs). For each PU, either intra-picture or inter-picture prediction is selected. Each TU is processed by a spatial block transformation and the transform coefficients for the TU are then quantized. The smallest TU size allowed for HEVC is 4×4.

In HEVC Test Model Version 5.0 (HM-5.0), the transform coefficients are coded TU by TU. For each TU, syntax elements last_significant_coeff_x and last_significant_coeff_y are transmitted to indicate the last non-zero coefficient horizontal and vertical positions respectively according to a selected scanning order. A TU is divided into multiple subsets for the TUs having size larger than 4×4. For an 8×8 TU, the 64 coefficients are divided into 4 subsets according to the diagonal scanning order through the entire 8×8 TU as shown in FIG. 2. The scanning through the transform coefficients will convert the two-dimensional data into a one-dimensional data. Each subset contains 16 continuous coefficients of the diagonally scanned coefficients. For TUs having size larger than 8×8(e.g. 16×16, 32×32) and non-square TUs (e.g. 16×4, 4×16, 32×8, 8×32), the TUs are divided into 4×4sub-blocks. Each sub-block corresponds to a coefficient sub-set. For each sub-block (i.e. each subset), the significance map, which is represented by significant_coeff_flag [x,y], is coded first. Variable x is the horizontal position of the coefficient within the sub-block and the value of x is from 0to (sub-block width −1). Variable y is the vertical position of the coefficient within the sub-block and the value of y is from 0 to (sub-block height −1). The flag, significant_coeff_flag[x,y] indicates whether the corresponding coefficient of the TU is zero or non-zero. For convenience, the index [x,y] is omitted from significant_coeff_flag[x, y]. For each non-zero coefficient as indicated by significant_coeff_flag, the level and sign of the non-zero coefficient is represented by coeff_abs_level_greater1_flag, coeff_abs_level_greater2_flag, coeff_abs_level_minus3, and coeff_sign_flag.

In HM-5.0, if the TU size is equal to 16×16, 32×32, 16×4, 4×16, 32×8, or 8×32, one significant_coeffgroup_flag is coded for each sub-block prior to the coding of level and sign of the sub-block (e.g. the significant_coeff_flag, coeff_abs_level_greater1_flag, coeff_abs_level_greater2_flag, coeff_ab_level_minus3, and coeff_sign_flag). If significant coeffgroup flag is equal to 0, it indicates that the entire 4×4 sub-block is zero. Therefore, there is no need for any additional information to represent this sub-block. Accordingly, the coding of level and sign of sub-block can be skipped. If significant_coeffgroup_flag is equal to 1, it indicates that at least one coefficient in the 4×4 sub-block is non-zero. The level and sign of each non-zero coefficient in the sub-block will be coded after the significant_coeffgroup_flag. The value of significant coeff_flag is inferred as 1 for the sub-block containing the DC term (i.e., the transform coefficient with the lowest spatial frequency).

In HM-5.0, significant_coeff_flag is coded in regular CABAC mode with context modeling. Different context selection methods are used for different TU sizes. For TUs with size of 4×4 or 8×8, the context selection is based on the position of the coefficient within the TU. FIG. 3 shows the position-based context selection map for a 4×4 TU and FIG. 4 shows the position-based context selection map for an 8×8 TU as adopted in HM-5.0. In FIG. 3, significance map 310 is used for the luma component and significance map 320 is used for the chroma component, where each number corresponds to a context selection. In FIG. 4, luma and chroma 8×8 TUs share the same significance map.

For other TU sizes, the neighboring-information-dependent context selection is adopted. FIGS. 5A and 5B illustrate examples of the neighboring-information-dependent context selection for luma and chroma components respectively. One context is used for the DC coefficient. For non-DC coefficients (i.e., AC coefficients), the context selection depends on the neighboring coefficients. For example, a group of neighboring non-zero coefficients including I, H, F, E, and B around a current coefficient X are used for the context selection. If none of the neighboring pixels is non-zero, context #0 is used for coefficient X. If one or two of the neighboring pixels are non-zero, context #1 is used for X. Otherwise context #2 is used for coefficient X.

In the above neighboring-information-dependent context selection, the non-DC coefficients of the entire TU are divided into two regions (i.e., region-1 and region-2) for the luma component and one region (region-2) for the chroma component. Different regions will use different context sets. Each context set includes three contexts (i.e., context #0, #1, and #2). The area of region-1 for the luma component can be mathematically specified by the x-position and y-position of a coefficient X within the TU. As shown in FIG. 5A, if the sum of x-position and y-position of coefficient X is smaller than a threshold value and greater than 0, region-1 context set is selected for coefficient X. Otherwise, region-2 context set is selected. The threshold value can be determined based on the width and the height of the TU. For example, the threshold can be set to a quarter of the maximum value of the TU width and the TU height. Accordingly, in the case of TU sizes 32×32, 32×8 or 8×32, the threshold value can be set to 8.

In HM-5.0, for TUs with sizes other than 4×4 and 8×8, the TUs will be divided into 4×4 sub-blocks for coefficient map coding. However, the criterion of region-1/region-2 context selection depends on the x-position and y-position of the transform coefficient. Therefore, some sub-blocks may cross the boundary between region-1 and region-2 and two context sets will be required for these sub-blocks. FIG. 6A illustrates an example where one 4×4 sub-block 610 (the center of the sub-block is indicated by a dot) for 16×16 TU 621, 16×4 622, and 4×16 TU 623 will use two context sets for significant coeff flag coding. FIG. 6B illustrates an example where three 4×4 sub-blocks 631 to 633 for 32×32 TU 641, 32×8 TU 642, and 8×32 TU 643 will use two context sets for significant_coeff_flag coding. For sub-blocks 632 and 633, the sum of x-potion and y-position of coefficient X has to be calculated in order to determine whether the coefficient X is in region-1 or region-2. For the sub-block containing the DC term, i.e., sub-block 631, the position of the DC term is known and all other coefficients in the sub-block belong to region-1. Therefore, significant_coeffgroup_flag can be inferred and there is no need to calculate the sum of x-position and y-position. For other sub-blocks, there is no need to calculate the sum of x-position and y-position of coefficient X since all coefficients of other sub-blocks are in region-2 and one context set for significant_coeff_flag coding is used.

Therefore, it is desirable to simplify the context selection process, such as to eliminate the requirement of calculating the sum of x-position and y-position of coefficient or to eliminate other operations.

SUMMARY OF THE INVENTION

A method and apparatus for significance map context selection are disclosed. According to one embodiment of the present invention, the TU is divided into one or more sub-blocks and at least two context sets are used for the TU. Non-DC transform coefficients in each sub-block are coded based on the same context, context set, or context formation. The context, context set, or context formation for each sub-block can be determined based on sub-block index in scan order, horizontal sub-block index, vertical sub-block index, video component type, TU width, TU height, or any combination of the above. For example, the sub-block index in scan order, the horizontal sub-block index, the vertical sub-block index, or a combination of them can be compared with a threshold to determine the context, context set, or context formation for each sub-block. The threshold is related to the TU width, the TU height or a combination of them. For example, the threshold can be set to the maximum of the TU width and the TU height divided by 16. In another embodiment of the present invention, the sum of the horizontal sub-block index and the vertical sub-block index is used to classify each sub-block into a class and the context, context set, or context formation is then determined according to the class. For example, the sum can be compared with a threshold to classify each sub-block and the threshold is derived based on the maximum of the TU width and the TU height divided by 16. The sub-block size can be 4×4, 4×8, 8×4, 8×8, 16×16, or 32×32.

A method and apparatus for significance group flag coding are disclosed. According to one embodiment of the present invention, the TUs are divided into one or more sub-blocks and the significance group flags are coded based on sub-block index in scan order, horizontal sub-block index, vertical sub-block index, video component type, TU width, TU height, context selection, context set selection, context formation selection, or any combination of the above. The context selection, the context set selection and the context formation selection are associated with significance map coding of the sub-block. When two sub-blocks use the same context selection, context set selection, or context formation selection for the significance map coding, the significance group flag coding will also share the same second context selection, second context set selection, or second context formation selection.

BRIEF DESCRIPTION OF THE DRAWINGS

FIG. 3 illustrates an example of context selection maps for the 4×4 TU of luma and chroma components used by HEVC Test Model Version 5.0.

FIG. 4 illustrates an example of context selection map for the 8×8 TU of luma and chroma components used by HEVC Test Model Version 5.0.

DETAILED DESCRIPTION

In order to eliminate the need to calculate the sum of x-position and y-position of a coefficient, embodiments of the present invention use block-based context selection to simplify and unify the context set, context selection and context formation for significant coeff flag coding.

For TU sizes other than 4×4 and 8×8, the region-1/region-2 context selection according to one embodiment of the present invention depends on the x-block-index and y-block-index of the sub-block instead of the x-position and y-position of the coefficient X. The x-block-index and y-block-index refer to the horizontal sub-block index and the vertical sub-block index respectively. The value of the x-block-index is from 0 to (number of horizontal sub-blocks −1). The value of the y-block-index is from 0 to (number of vertical sub-blocks −1). In a system incorporating an embodiment of the present invention, none of the sub-blocks will cross the boundary between region-1 and region-2 There is no need to use two context sets for significant_coeff_flag coding or to calculate the sum of x-position and y-position for each coefficient. The region-1/region-2 determination can be based on the sum of the x-block-index and y-block-index of each sub-block. The sum can be compared with a threshold. The threshold value can either depend on the TU width and/or height or can be a fixed value.

Figure 1:
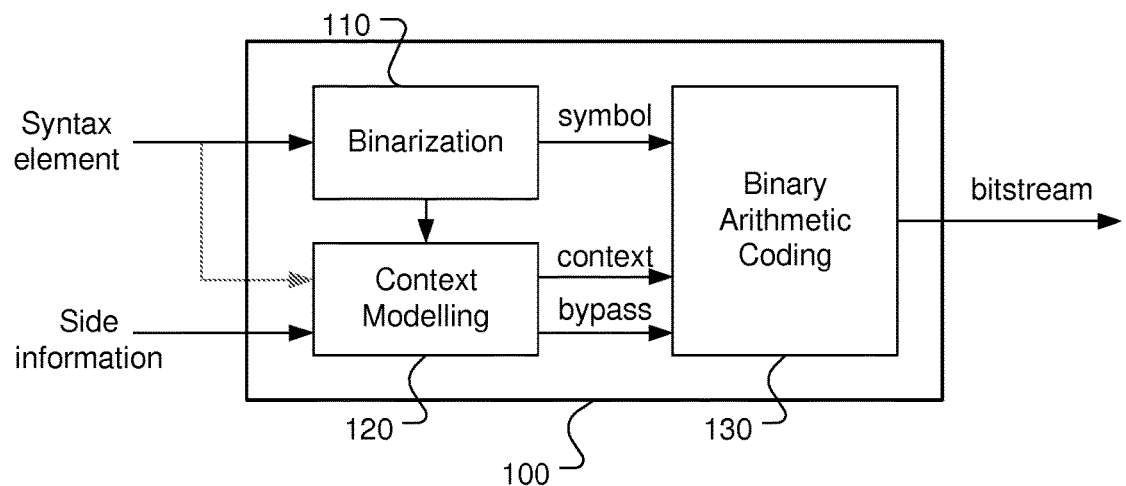
FIG. 1 illustrates exemplary architecture of CABAC encoding system with a bypass mode.
Figure 2:
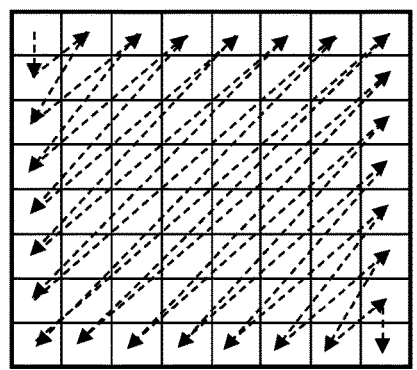
FIG. 2 illustrates an exemplary diagonal scanning order for the transform coefficinets of an 8×8 TU.
Figure 5A:
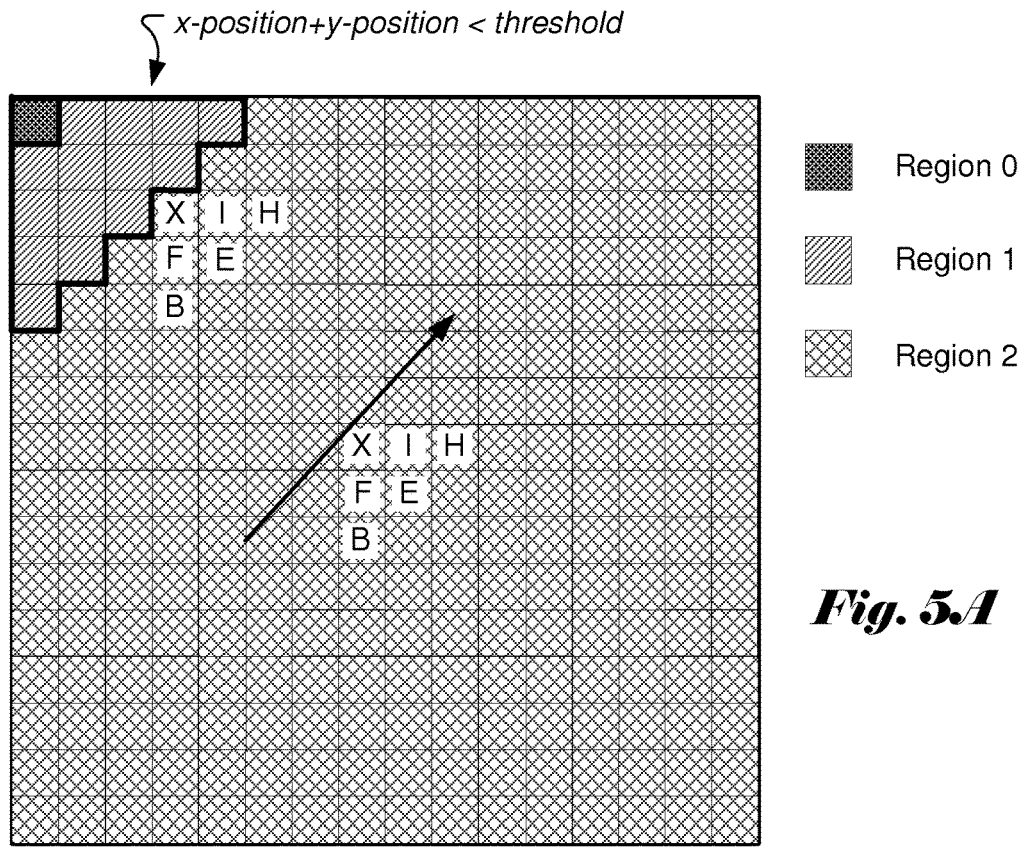
FIG. 5A illustrates an example of neighboring-information-dependent context selection for the 16×16 TU of luma component used by HEVC Test Model Version 5.0.
Figure 5B:
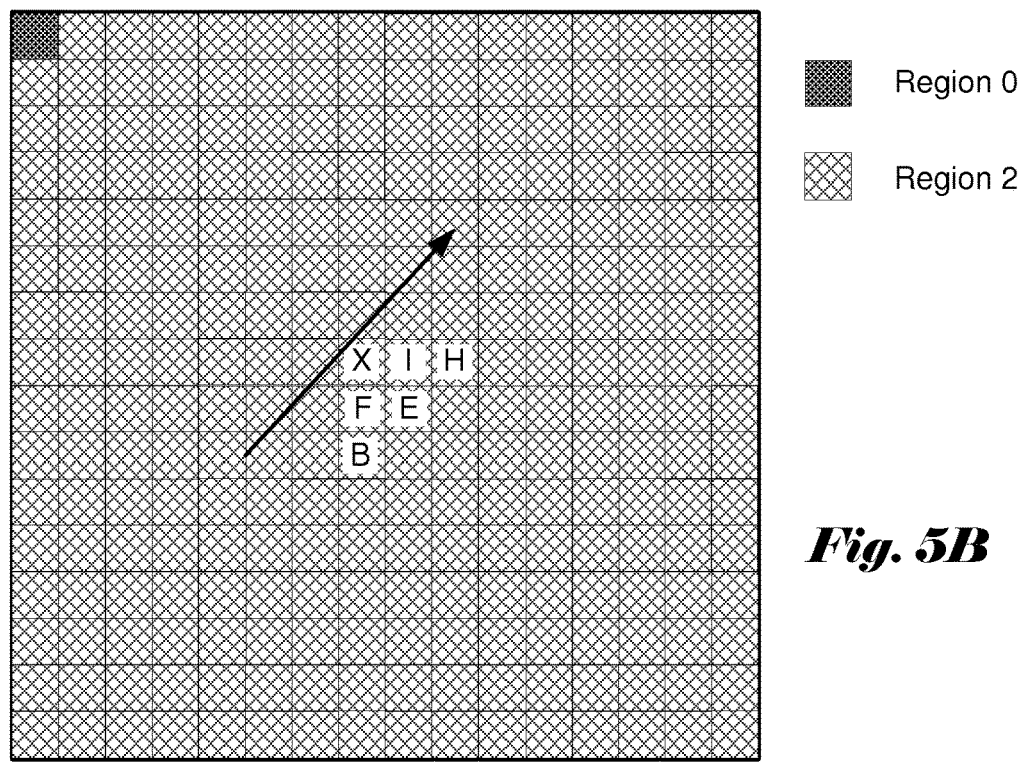
FIG. 5B illustrates an example of neighboring-information-dependent context selection for the 16×16 TU of chroma component used by HEVC Test Model Version 5.0.
Figure 6A:
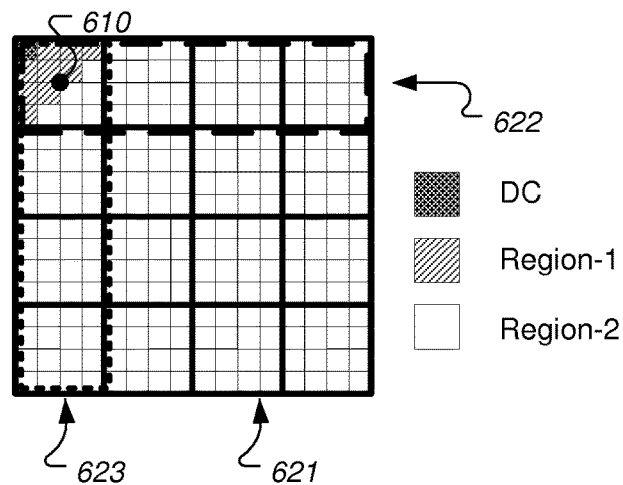
FIG. 6A illustrates an example of context selection for the 16×16 TU of luma component used by HEVC Test Model Version 5.0.
Figure 6B:
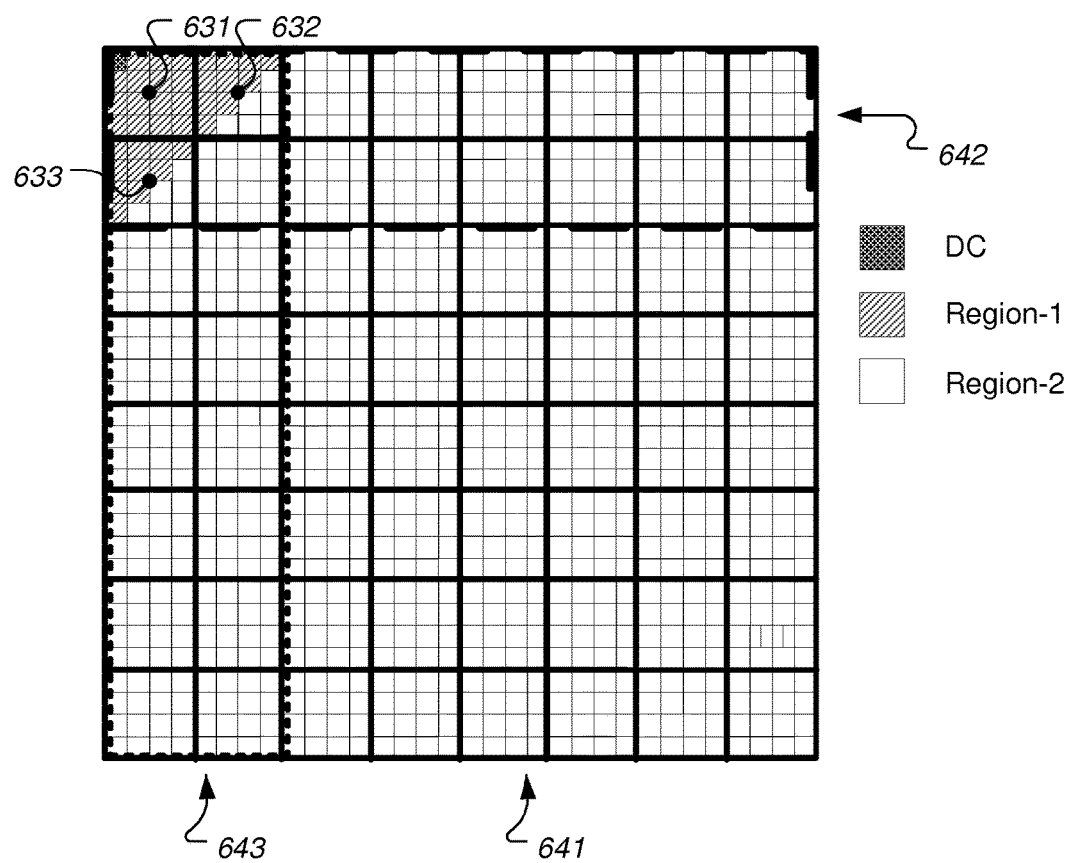
FIG. 6B illustrates an example of context selection for the 32×32 TU of luma component used by HEVC Test Model Version 5.0.
Figure 7A:
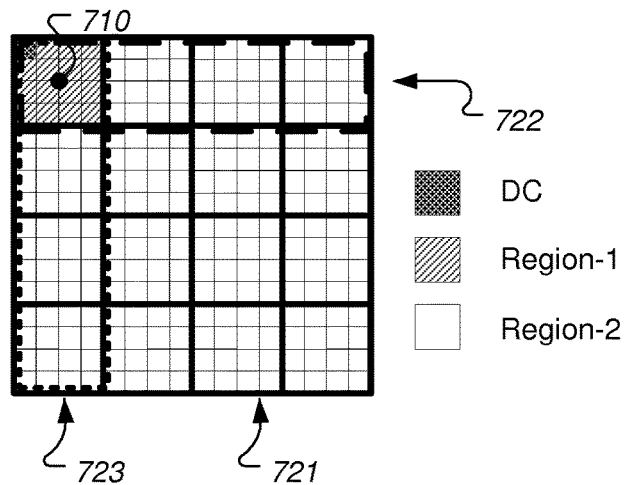
FIG. 7A illustrates an example of block-based context selection for the 16×16 TU of luma component according to an embodiment of the present invention.
Figure 7B:
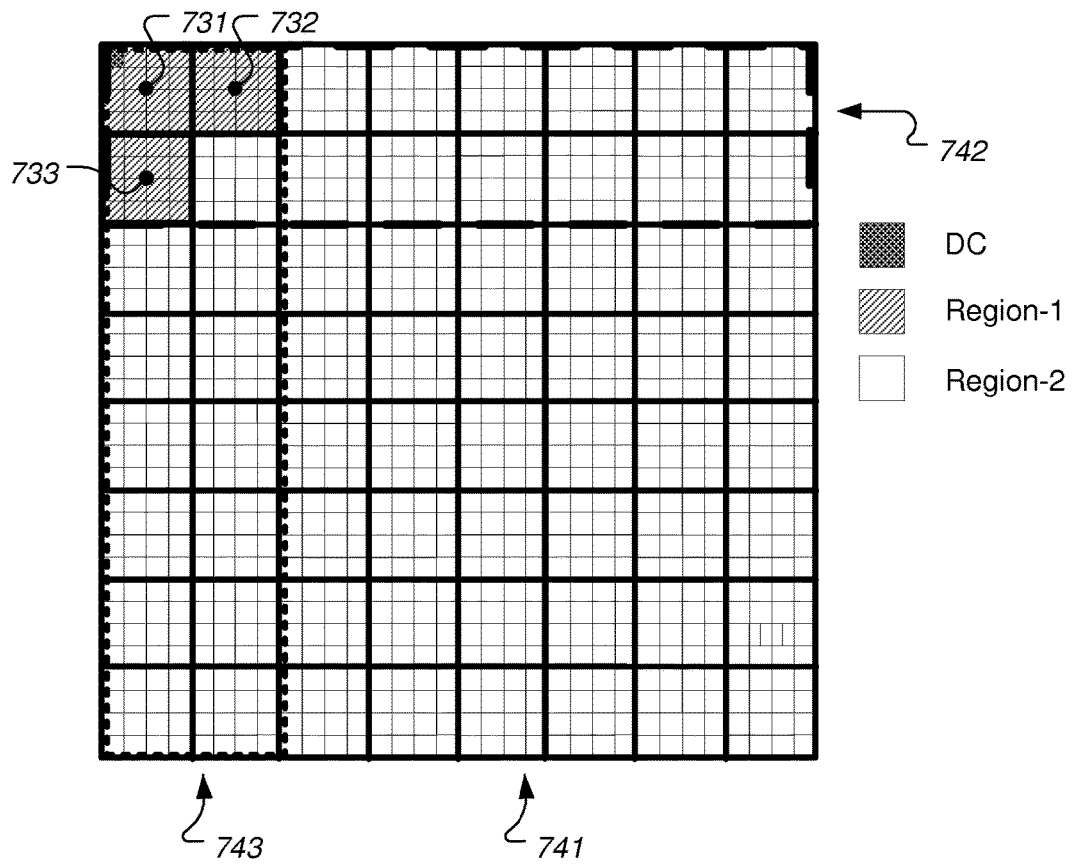
FIG. 7B illustrates an example of block-based context selection for the 32×32 TU of luma component according to an embodiment of the present invention.

FIG. 7A and FIG. 7B illustrates an example of block-based context selection according to an embodiment of the present invention. In this example, the threshold value is set to the maximum value of TU width and TU height divided by 16. Therefore, the threshold value is 1 for 16×16 TU 721, 16×4 TU 722, and 4×16 TU 723 and the threshold value is 2 for 32×32 TU 741, 32×8 TU 742 and 8×32 TU 743. For the luma component, if the sum of x-block-index and y-block-index of the sub-block is smaller than the threshold value, region-1 context set is used for the sub-block. Otherwise region-2 context set is used for the sub-block. Accordingly, one sub-block 710 in FIG. 7A and three sub-blocks 731 through 733 in FIG. 7B use region-1 context and other sub-blocks use region-2 context. Furthermore, the value of significant_coeffgroup_flag can be inferred as 1 for region-1 sub-blocks for unification.

While the 4×4 sub-block is used as an example of the block-based context selection, other sub-block sizes may also be used. For example, instead of the 4×4 sub-blocks, other sub-blocks such as 4×8, 8×4, 8×8, 16×16 and 32×32 may also be used. While the above block-based significance map coding is used for context selection, the block-based significance map coding may also be used for context set selection or context formation selection. While the examples of block-based significance map coding shown above select context, context set or context formation based on sub-block index in scan order, horizontal sub-block index (i.e., x-block-index) and/or vertical sub-block index (i.e., y-block-index), the selection may also be based on the video component type and/or the TU width/height. The video component type may correspond to the luma component (Y) or the chroma component (Cr or Cb). The video component type may correspond to other video formats. Furthermore, the selection may depend on a combination of sub-block index in scan order, horizontal sub-block index, vertical sub-block index, video component type, and TU width/height.

The block-based significance group flag coding may be based on sub-block index in scan order, horizontal sub-block index (i.e., x-block-index) and/or vertical sub-block index (i.e., y-block-index). The block-based significance group flag coding may also be based on the video component type and/or the TU width/height. Furthermore, the block-based significance group flag coding may also be based on the context, context set, or context formation selection associated with the significance map coding. The block-based significance group flag coding may also depend on a combination of sub-block index in scan order, horizontal sub-block index, vertical sub-block index, video component type, TU width/height, context, context set, and context formation selection associated with the significance map coding.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of significance map context selection, the method comprising:

receiving transform coefficients associated with a (transform unit (TU), wherein the TU is divided into a plurality of sub-blocks, at least one first context set is used for non-DC transform coefficients in the TU and at least one second context set is used for a DC coefficient in the TU that is different from the at least one first context set;

coding, for each sub-block, all non-DC transform coefficients in the respective sub-block based on a single context set from the at least one first context set for significant map coding; and coding the DC coefficient in one sub-block of the TU based on a single context set from the at least one second context set for significant map coding.

2. The method of claim 1, wherein the single context set for the respective sub-block is determined based on a sub-block index in scan order, a horizontal sub-block index, a vertical sub-block index, a video component type, a TU width, a TU height, or a combination thereof.

3. The method of claim 2, wherein the single context set for the respective sub-block is determined by comparing the sub-block index in scan order, the horizontal sub-block index, the vertical sub-block index, or a combination thereof with a threshold.

4. The method of claim 3, wherein the threshold is related to the TU width, the TU height or a combination thereof.

5. The method of claim 4, wherein the threshold is derived based on a maximum of the TU width and the TU height divided by 16.

6. The method of claim 2, wherein a sum of the horizontal sub-block index and the vertical sub-block index of the respective sub-block is used to classify the respective sub-block into a class, wherein the single context set for the respective sub-block is determined according to the class.

7. The method of claim 6, wherein the sum is compared with a threshold to classify the respective sub-block and the threshold is derived based on a maximum of the TU width and the TU height divided by 16.

8. The method of claim 1, wherein the transform coefficients of each sub-block are converted into one-dimensional coefficients using a scanning order.

9. The method of claim 1, wherein at least one sub-block has a size corresponding to 4×4, 4×8, 8×4, 8×8, 16×16, or 32×32.

10. An apparatus for significance map context selection, the apparatus comprising one or more electronics circuits configured for:

receiving transform coefficients associated with a transform unit(TU), wherein the TU is divided into a plurality of sub-blocks, at least one first context set is used for non-DC transform coefficients in the TU and at least one second context set is used for a DC coefficient in the TU that is different from the at least one first context set;

coding, for each sub-block, all non-DC transform coefficients in the respective sub-block based on a single context set from the at least one first context set for significance map coding; and coding the DC coefficient in one sub-block of the TU based on a single context set from the at least one second context set for significant map coding.

11. The apparatus of claim 10, wherein the single context set for the respective sub-block is determined based on a sub-block index in scan order, a horizontal sub-block index, a vertical sub-block index, a video component type, a TU width, a TU height, or a combination thereof.

12. The apparatus of claim 11, wherein the single context set for the respective sub-block is determined by comparing the sub-block index in scan order, the horizontal sub-block index, the vertical sub-block index, or a combination thereof with a threshold.

13. The apparatus of claim 12, wherein the threshold is related to the TU width, the TU height or a combination thereof.

14. The apparatus of claim 13, wherein the threshold is derived based on a maximum of the TU width and the TU height divided by 16.

15. The apparatus of claim 11, wherein a sum of the horizontal sub-block index and the vertical sub-block index of the respective sub-block is used to classify the respective sub-block into a class, wherein the single context set for the respective sub-block is determined according to the class.

16. The apparatus of claim 15, wherein the sum is compared with a threshold to classify the respective sub-block and the threshold is derived based on a maximum of the TU width and the TU height divided by 16.

17. The apparatus of claim 10, wherein the transform coefficients of each sub-block are converted into one-dimensional coefficients using a scanning order.

18. The apparatus of claim 10, wherein at least one sub-block has a size corresponding to 4×4, 4×8, 8×4, 8×8, 16×16, or 32×32.

19. A non-transitory computer readable medium storing a computer-executable program, the computer-executable program, when executed, causing a decoder to perform the following steps:

receiving transform coefficients associated with a transform unit (TU), wherein the TU is divided into a plurality of sub-blocks, at least one first context set is used for non-DC transform coefficients in the TU and at least one second context set is used for a DC coefficient in the TU that is different from the at least one first context set;

coding, for each sub-block, all non-DC transform coefficients in the respective sub-block based on a single context set from the at least one first context set for significant map coding; and coding the DC coefficient in one sub-block of the TU based on a single context set from the at least one second context set for significant map coding.

* * * * *